(12) United States Patent
Fujita et al.

(10) Patent No.: US 6,626,584 B2
(45) Date of Patent: Sep. 30, 2003

(54) TWO-WAY OPTICAL COMMUNICATION DEVICE, TWO-WAY OPTICAL COMMUNICATION SYSTEM, AND METHOD FOR ASSEMBLING TWO-WAY OPTICAL COMMUNICATION DEVICE

(75) Inventors: Hideaki Fujita, Nara (JP); Yorishige Ishii, Nara (JP); Yoshifumi Iwai, Nara (JP); Toshiyuki Matsushima, Nara (JP); Toshihiro Tamura, Nara (JP); Yukio Kurata, Nara (JP)

(73) Assignee: Sharp Kabushiki Kaisha (JP)

( * ) Notice: Subject to any disclaimer, the term of this patent is extended or adjusted under 35 U.S.C. 154(b) by 0 days.

(21) Appl. No.: 09/925,910

(22) Filed: Aug. 9, 2001

(65) Prior Publication Data

US 2002/0041731 A1 Apr. 11, 2002

(30) Foreign Application Priority Data

Aug. 10, 2000 (JP) ........................ 2000-243235
May 28, 2001 (JP) ........................ 2001-159756

(51) Int. Cl.$^7$ ................................ G02B 6/36
(52) U.S. Cl. ........................ 385/88; 385/49; 385/89; 385/93
(58) Field of Search ................ 385/31, 33, 36, 385/49, 88, 89, 93; 329/154, 180, 189, 193, 179, 188, 195

(56) References Cited

U.S. PATENT DOCUMENTS 5,771,322 A * 6/1998 Matsumoto et al. .......... 385/31
6,097,521 A * 8/2000 Althaus et al. ............ 359/143
6,222,972 B1 * 4/2001 Yamamoto et al. ......... 385/127
6,351,584 B1 * 2/2002 Horie et al. ................. 385/31
6,438,289 B1 * 8/2002 Serizawa ..................... 385/31

FOREIGN PATENT DOCUMENTS

JP      62-222211     9/1987
JP      10-153720     6/1998

* cited by examiner

Primary Examiner—Audrey Chang
Assistant Examiner—Denise Allen
(74) Attorney, Agent, or Firm—George W. Neuner; Edwards & Angell, LLP

(57) ABSTRACT

A two-way optical communication device for use in a two-way optical communication system for transmitting and receiving an optical signal via a single optical fiber, comprises a light emitting element for generating transmitted light, a photodetector for receiving incoming light emitted from the optical fiber, and a reflection mirror made of a thin film having a high reflectance, having first and second surfaces, the first surface being opposite to the second surface. An optical member including the reflection mirror is provided closer to the optical fiber than the light emitting element. The incoming light emitted from the optical fiber is reflected by the first surface of the reflection mirror to be guided to the photodetector. The transmitted light emitted from the light emitting element or the transmitted light reflected by an end surface of the optical fiber is reflected by at least a portion of the second surface of the reflection mirror to prevent the transmitted light from entering the photodetector.

21 Claims, 10 Drawing Sheets

1600

1700

TWO-WAY OPTICAL COMMUNICATION DEVICE, TWO-WAY OPTICAL COMMUNICATION SYSTEM, AND METHOD FOR ASSEMBLING TWO-WAY OPTICAL COMMUNICATION DEVICE

BACKGROUND OF THE INVENTION

1. Field of the Invention

The present invention relates to a two-way optical communication device and a two-way optical communication system both capable of transmitting and receiving optical signals bidirectionally, and a method for assembling the two-way optical communication device. More particularly, the present invention relates to a two-way optical communication device and a two-way optical communication system both employed for home communication, device-to-device communication, a local area network (LAN), and the like, in which a multi-mode optical fiber, such as a plastic optical fiber, is used as a transmission path.

2. Description of the Related Art

As an information society develops, network technologies using fiber-optic communication have been a focus of attention. Particularly, such technologies are applied to household communication and device-to-device communication with the advent of recent plastic optical fibers having low light loss and broad band capabilities. Hereinafter, plastic optical fibers are also referred to as POFs.

Conventionally, a dominating optical communication system for transmitting and receiving optical signals having the same wavelength through an optical fiber(s) as a transmission medium is a system in which two optical fibers are used to perform full duplex optical communication. However, when two optical fibers are employed, it is difficult to reduce the size of an optical communication device, and the cost of the optical fibers is increased with an increase in a transmission distance. Therefore, a two-way optical communication device has been proposed in which a single optical fiber is used to perform full duplex optical communication.

In such a two-way optical communication device, transmission and reception are performed on the same optical fiber, so that it is important as to how to prevent interference between transmitted light and incoming light. Causes of incoming light interfering with transmitted light are: (1) when transmitted light enters an optical fiber, a portion of the light is reflected by an end surface of the optical fiber (hereinafter referred to as near-end reflection); (2) when transmitted light which has propagated through an optical fiber is emitted from the optical fiber, a portion of the light is reflected by an end surface of the optical fiber (hereinafter referred to as far-end reflection); (3) transmitted light is reflected by the two-way optical communication device on the other end (hereinafter referred to as reflection on the other-end module); (4) internally scattered light within the two-way optical communication device (hereinafter referred to as stray light); and the like. Further, there are problems other than the optical interference between transmitted light and incoming light, such as (5) electrical or electromagnetic noise. In this case, a signal-to-noise (S/N) ratio is reduced.

Japanese Laid-Open Publication No. 10-153720 discloses a representative method which has been conventionally proposed in order to solve the above-described problems. In this method, a polarization separation device (polarization separation film) is used to separate transmitted light from incoming light. This conventional technique will be described with reference to FIG. 16.

In a two-way optical communication device 1600 as shown in FIG. 16, transmitted light 108 emitted from a laser diode 104, which is in the form of S-polarization, enters a polarization reflection film 107 provided on a tilted surface of a prism 111. The transmitted light 108 is mostly reflected by the polarization reflection film 107, condensed by a lens 106, and coupled to an optical fiber 102. Incoming light 109 emitted from the multi-mode optical fiber 102 is condensed by the lens 106 and enters the polarization reflection film 107 in the form of random polarization. The substantial half of the incoming light 109 is reflected by the polarization reflection film 107 while the remaining half is transmitted by the polarization reflection film 107 to be coupled to a photodetector 105. In this case, the transmitted light 108 reflected by the optical fiber 102 is in the form of S-polarized light and therefore, is substantially perfectly reflected by the polarization reflection film 107 so as not to be coupled to the photodetector 105. Therefore, transmitted light of near-end reflection can be prevented from interfering with the incoming light.

Further, there is another known method which prevents transmitted light of near-end reflection from interfering with incoming light by providing a light blocking plate between a transmitter portion and a receiver portion. This conventional technique will be described with reference to FIG. 17.

In a two-way optical communication device 1700 as shown in FIG. 17, transmitted light 208 emitted from a light emitting element 204 is condensed by a transmission optical system 206 and coupled to an optical fiber 202. Incoming light 209 emitted from the optical fiber 202 is condensed by a reception optical system 224 and coupled to a photodetector 205. Further, a light blocking plate 207 made of metal or the like is provided between a transmitter portion and a receiver portion so that the transmitted light 208 reflected by the optical fiber 202 is prevented from being coupled to the photodetector 205.

Furthermore, Japanese Laid-Open Publication No. 62-222211 discloses a method in which transmitted light is condensed by a spheroid type mirror and coupled to an optical fiber. In this method, transmitted light emitted from a light emitting element is reflected from a concave mirror toward an optical fiber, condensed and coupled to an optical fiber. This concave mirror is in the shape of a spheroid. A light emitting element is provided at one of the two focus positions of the concave mirror, while an end surface of the optical fiber is provided at the other focus position. Therefore, transmitted light emitted from the light emitting element is conversed on the end surface of the optical fiber and coupled to the optical fiber. Similarly, if a photodetector is provided instead of the light emitting element, it is possible to efficiently receive incoming light emitted from an optical fiber.

In the method disclosed in the above-described Japanese Laid-Open Publication No. 10-153720, the substantial half of incoming light is reflected by the polarization reflection film 107, resulting in a reception loss of about 3 dB. Therefore, light cannot be efficiently used. In this conventional technique, transmitted light of near-end reflection can be prevented from interfering with incoming light. However, since light of far-end reflection and of reflection on an other-end module has random polarization directions, it is difficult to separate between transmitted light and incoming light. Further, since the conventional technique utilizes polarization, an inexpensive light emitting diode (LED) cannot be used as the light emitting element. Furthermore, in the conventional technique, an expensive polarization separation film (polarization reflection film) is required, leading to an increase in cost. Further still, in the conventional technique, the laser diode 104 is disposed close to the photodetector 105, both of which are provided on a substrate. Furthermore, since the laser diode 104 is not shielded, electrical or eletromagnetic noise easily occurs.

A problem with the two-way optical communication device 1700, in which the light blocking plate 207 is used to separate the transmitter portion and the receiver portion, is that the number of parts is increased raising the cost, and that a region of the optical fiber 202 corresponding to the thickness of the light blocking plate 207 cannot be used, resulting in a reduction in reception efficiency. Further, in this conventional technique, the degree of freedom in disposing the light emitting element 204 and the photodetector 205 is low. Therefore, the transmission optical system 206 and the reception optical system 224 need to be positioned with respect to each other with great precision, leading to an increase in manufacturing cost.

Further, the technique disclosed in Japanese Laid-Open Publication No. 62-222211 can be applied to two-way optical communication using two optical fibers, but not to two-way optical communication and full duplex communication which employ a single optical fiber.

SUMMARY OF THE INVENTION

According to one aspect of the present invention, a two-way optical communication device for use in a two-way optical communication system for transmitting and receiving an optical signal via a single optical fiber, comprises a light emitting element for generating transmitted light, a photodetector for receiving incoming light emitted from the optical fiber, and a reflection mirror made of a thin film having a high reflectance, having first and second surfaces, the first surface being opposite to the second surface. An optical member including the reflection mirror is provided closer to the optical fiber than the light emitting element. The incoming light emitted from the optical fiber is reflected by the first surface of the reflection mirror to be guided to the photodetector. The transmitted light emitted from the light emitting element or the transmitted light reflected by an end surface of the optical fiber is reflected by at least a portion of the second surface of the reflection mirror to prevent the transmitted light from entering the photodetector. Thereby, the above-described objective is achieved.

According to the above-described configuration, transmitted light reflected by the optical fiber and incoming light are separated by the reflection mirror which guides the incoming light to the photodetector, thereby making it possible to prevent interference between the transmitted light of near-end reflection and incoming light. Further, the reflection mirror provided in an optical member is used to separate the transmitted light and the incoming light, thereby reducing the number of parts as compared to conventional technologies using a polarization separation film or a light blocking plate to separate the transmitted light and the incoming light. Further, since light of near-end reflection can be separated by the reflection mirror, a reduction in efficiency in the use of light due to polarization separation losses as in a conventional technology using a polarization separation film does not occur. Since the separation of the light of near-end reflection is achieved by the reflection mirror made of a thin film, a reception region can be large so that a reduction in efficiency of the use of light due to a reduction in a reception region caused by the thickness of a light blocking plate in a conventional technology can be prevented. Furthermore, stray light which is scattered light occurring within the two-way optical communication device due to the reflection mirror can be prevented from entering the photodetector.

According to another aspect of the present invention, a two-way optical communication device for use in a two-way optical communication system for transmitting and receiving an optical signal via a single optical fiber, comprises a light emitting element for generating transmitted light, a photodetector for receiving incoming light emitted from the optical fiber, and a reflection mirror made of a thin film having a high reflectance, having first and second surfaces, the first surface being opposite to the second surface. An optical member including the reflection mirror is provided closer to the optical fiber than the light emitting element. The incoming light emitted from the optical fiber is reflected by the first surface of the reflection mirror to be guided to the photodetector. An optical absorbing layer is provided on at least a portion of the second surface of the reflection mirror, and the transmitted light emitted from the light emitting element or the transmitted light reflected by an end surface of the optical fiber is absorbed by the optical absorbing layer to prevent the transmitted light from entering the photodetector. Thereby, the above-described objective is achieved.

According to the above-described configuration, transmitted light reflected by the optical fiber and incoming light are separated by the reflection mirror which guides the incoming light to the photodetector, thereby making it possible to prevent interference between the transmitted light of near-end reflection and incoming light. Further, the reflection mirror provided in an optical member is used to separate the transmitted light and the incoming light, thereby reducing the number of parts as compared to conventional technologies using a polarization separation film or a light blocking plate to separate the transmitted light and the incoming light. Further, since light of near-end reflection can be separated by the reflection mirror, a reduction in efficiency in the use of light due to polarization separation losses as in a conventional technology using a polarization separation film does not occur. Since the separation of the light of near-end reflection is achieved by the reflection mirror made of a thin film, a reception region can be large so that a reduction in efficiency of the use of light due to a reduction in a reception region caused by the thickness of a light blocking plate in a conventional technology can be prevented. Furthermore, stray light which is scattered light occurring within the two-way optical communication device due to the reflection mirror can be prevented from entering the photodetector. Furthermore, stray light can be absorbed in the two-way optical communication device by the optical absorbing layer, thereby preventing interference.

In one embodiment of the present invention, the reflection mirror is in the shape of a curved surface, the incoming light emitted from the optical fiber is reflected and condensed by the reflection mirror, and the condensed incoming light is coupled to the photodetector.

According to the above-described configuration, since incoming light is condensed by a reflection mirror, an additional condensing lens is not required. Therefore, the number of parts is reduced, thereby making it easy to adjust assembly.

In one embodiment of the present invention, the transmitted light emitted from the light emitting element propagates through a portion of the optical member including the reflection mirror.

According to the above-described configuration, when a transmitter portion (through which transmitted light propagates) and a receiver portion (in which a photodetector is provided) are optically separated by the reflection mirror, the transmitted light is passed through a portion of the optical member in which the reflection mirror is provided-. Since the reflection mirror is made of a thin film, the transmission light can be passed in the vicinity of the receiver portion, thereby minimizing the boundary between a transmission region and a reception region (regions in the optical fiber) and therefore reducing the size of a two-way optical communication device.

In one embodiment of the present invention, the two-way optical communication device of the present invention further comprises a lens for condensing the transmitted light emitted from the light emitting element, wherein the lens is provided in the optical member.

According to the above-described configuration, a condensing optical system for transmission and reception can be constructed by a single optical member, resulting in a small-size, inexpensive, and easy-to-assemble two-way optical communication device.

In one embodiment of the present invention, the two-way optical communication device of the present invention further comprises a prism for refracting the transmitted light into the optical fiber, wherein the prism is provided in the optical member at a first position, the transmitted light being emitted from the first position to the optical fiber.

According to the above-described configuration, transmitted light is refracted by a prism so as to enter an optical fiber from a peripheral direction, thereby making it possible to enlarge the reception region of an optical fiber. Further, by using the prism, interference due to other-end module reflection can be suppressed. Furthermore, the degree of freedom of positioning of a light emitting element can be increased. The prism is integrated into the optical member, thereby obtaining a small-size and easy-to-assemble two-way optical communication device.

In one embodiment of the present invention, a surface of the optical member is used as a portion of a shielding member for shielding the light emitting element from the outside, the lens being provided on the surface of the optical member.

According to the above-described configuration, the optical member functions as a cover glass for the light emitting element, thereby reducing the number of parts and making it easy to assemble a two-way optical communication device.

In one embodiment of the present invention, an optical axis of the light emitting element is tilted with respect to an optical axis of the optical fiber.

According to the above-described configuration, a portion of incoming light emitted from the optical fiber is brought to and reflected by the light emitting element can be prevented from being coupled back to the optical fiber, resulting in a reduction in other-end module reflection.

In one embodiment of the present invention, a photodetecting surface of the photodetector is tilted with respect to an optical axis of the optical fiber.

According to the above-described configuration, a portion of incoming light emitted from the optical fiber is brought to and reflected by the photodetector can be prevented from being coupled back to the optical fiber, resulting in a reduction in other-end module reflection.

According to another aspect of the present invention, a two-way optical communication device for use in a two-way optical communication system for transmitting and receiving an optical signal via a single optical fiber, comprises a light emitting element for generating transmitted light, a photodetector for receiving incoming light emitted from the optical fiber, and a reflection mirror made of a thin film having a high reflectance, having first and second surfaces, the first surface being opposite to the second surface. An optical member including the reflection mirror is provided closer to the optical fiber than the photodetector. The incoming light emitted from the optical fiber is reflected by the first surface of the reflection mirror to be guided to the photodetector. The transmitted light reflected by an end surface of the optical fiber is reflected by the first surface of the reflection mirror to prevent the transmitted light from entering the photodetector. Thereby, the above-described objective is achieved.

According to the above-described configuration, transmitted light reflected by the optical fiber and incoming light are separated by the reflection mirror which guides the incoming light to the optical fiber, thereby making it possible to prevent interference between the transmitted light of near-end reflection and incoming light. Further, the reflection mirror provided in an optical member is used to separate the transmitted light and the incoming light, thereby reducing the number of parts as compared to conventional technologies using a polarization separation film or a light blocking plate to separate the transmitted light and the incoming light. Further, since light of near-end reflection can be separated by the reflection mirror, a reduction in efficiency in the use of light due to polarization separation losses as in a conventional technology using a polarization separation film does not occur. Since the separation of the light of near-end reflection is achieved by the reflection mirror made of a thin film, a reception region can be large so that a reduction in efficiency of the use of light due to a reduction in a reception region caused by the thickness of a light blocking plate in a conventional technology can be prevented. Furthermore, stray light which is scattered light occurring within the two-way optical communication device due to the reflection mirror can be prevented from entering the photodetector.

In one embodiment of the present invention, the reflection mirror is in the shape of a curved surface, the incoming light emitted from the optical fiber is reflected and condensed by the reflection mirror, and the condensed incoming light is coupled to the photodetector.

According to the above-described configuration, since incoming light is condensed by a reflection mirror, an additional condensing lens is not required. Therefore, the number of parts is reduced, thereby making it easy to adjust assembly.

In one embodiment of the present invention, the transmitted light emitted from the light emitting element propagates through a portion of the optical member including the reflection mirror.

According to the above-described configuration, when a transmitter portion (through which transmitted light propagates) and a receiver portion (in which a photodetector is provided) are optically separated by the reflection mirror, the transmitted light is passed through a portion of the optical member in which the reflection mirror is provided. Since the reflection mirror is made of a thin film, the transmission light can be passed in the vicinity of the receiver portion, thereby minimizing the boundary between a transmission region and a reception region (regions in the optical fiber) and therefore reducing the size of a two-way optical communication device.

In one embodiment of the present invention, the two-way optical communication device of the present invention further comprises a lens for condensing the incoming light to the photodetector, wherein the lens is provided in the optical member.

According to the above-described configuration, a condensing optical system for transmission and reception can be constructed by a single optical member, resulting in a small-size, inexpensive, and easy-to-assemble two-way optical communication device.

In one embodiment of the present invention, an optical axis of the light emitting element is tilted with respect to a direction perpendicular to an optical axis of the optical fiber.

According to the above-described configuration, a portion of incoming light emitted from the optical fiber is brought to and reflected by the light emitting element can be prevented from being coupled back to the optical fiber, resulting in a reduction in other-end module reflection.

In one embodiment of the present invention, a photodetecting surface of the photodetector is tilted with respect to a direction perpendicular to an optical axis of the optical fiber.

According to the above-described configuration, a portion of incoming light emitted from the optical fiber is brought to and reflected by the photodetector can be prevented from being coupled back to the optical fiber, resulting in a reduction in other-end module reflection.

In one embodiment of the present invention, a portion of the reflection mirror contacts or is close to an end surface of the optical fiber.

According to the above-described configuration, a portion of the reflection mirror (not the entire rear surface of the reflection mirror, but a light blocking portion provided at a tip portion of the rear surface of the reflection mirror at the optical fiber side) can reliably prevent interference between transmitted light of near-end reflection and incoming light.

In one embodiment of the present invention, the reflection mirror is electrically connected to a ground electrode of the photodetector.

According to the above-described configuration, the photodetector is electrically and electromagnetically separated from a light emitting element, thereby reducing electric and electromagnetic interference.

In one embodiment of the present invention, a photodetector positioning portion for setting a relative position of the photodetector with respect to the optical member is provided at a portion of the optical member, and the photodetector is positioned using the photodetector positioning portion.

According to the above-described configuration, the photodetector and the optical member can be directly positioned with respect to each other, thereby making it possible to position the photodetector and the optical member with high precision using an easy method.

In one embodiment of the present invention, a light emitting element positioning portion for setting a relative position of the light emitting element with respect to the optical member is provided at a portion of the optical member, and the light emitting element is positioned using the light emitting element positioning portion.

According to the above-described configuration, the light emitting element and the optical member can be directly positioned with respect to each other, thereby making it possible to position the light emitting element and the optical member with high precision using an easy method.

According to another aspect of the present invention, a two-way optical communication system comprises a plurality of two-way optical communication devices joined to respective ends of optical fibers. An optical signal is transmitted and received between at least two of the plurality of two-way optical communication device. At least one of the plurality of two-way optical communication devices is the two-way optical communication device of the present invention. Thereby, the above-described objective is achieved.

According to the above-described configuration, by using the two-way optical communication devices of the present invention capable of preventing interference between transmitted light and incoming light, full duplex communication can be realized using a single optical fiber, thereby obtaining a small-size and low-cost two-way optical communication system.

In one embodiment of the present invention, the end surface of the optical fiber is tilted with respect to an optical axis of the optical fiber.

According to the above-described configuration, light reflected when the light which has propagated through the optical fiber is emitted from the optical fiber (light of far-end reflection) can be prevented from entering the photodetector. Light reflected by an end surface of the optical fiber when entering the optical fiber is reflected by the optical fiber toward a peripheral direction of the optical fiber, thereby easily preventing interference between transmitted light of near-end reflection and incoming light. Furthermore, incoming light is refracted toward a photodetector side, thereby making it possible to couple incoming light to the photodetector with high efficiency.

In one embodiment of the present invention, the end surface of the optical fiber is in the shape of a spherical surface.

According to the above-described configuration, light reflected when the light which has propagated through the optical fiber is emitted from the optical fiber (light of far-end reflection) can be prevented from entering the photodetector. Light reflected by an end surface of the optical fiber when entering the optical fiber is reflected by the optical fiber toward a peripheral direction of the optical fiber, thereby easily preventing interference due to near-end reflection. Further, incoming light can be condensed and emitted from an end surface of the optical fiber, thereby making it possible to couple incoming light to the photodetector with higher efficiency. Furthermore, it is not necessary to restrict a specific connection direction between the optical fiber and the two-way optical communication device, resulting in easy connection.

In one embodiment of the present invention, the optical fiber is a plastic optical fiber including a core and a clad both made of plastic material.

According to the above-described configuration, the optical fiber is a POF, whereby a bend loss is small and the optical fiber is unlikely to be broken. Further, an optical fiber having a large core diameter of about 1 mm can be easily produced, thereby making it possible to easily join the optical fiber to a two-way optical communication device (positioning), and to produce an inexpensive two-way optical communication system.

In one embodiment of the present invention, the optical fiber is a polymer clad fiber including a clad made of plastic material and a core made of quartz.

According to the above-described configuration, the optical fiber is a PCF, whereby a transmission band is broad and long-distance and high-speed communication can be realized.

According to another aspect of the present invention, a method is provided for assembling the two-way optical communication device of the present invention. A receiver portion assembling member for setting relative positions of the portion of the optical member and the photodetector positioning portion by contacting the receiver portion assembling member with the portion of the optical member and the photodetector positioning portion is used to position the photodetector and the optical member. Thereby, the above-described objective is achieved.

According to the above-described method, the light emitting element positioning portion provided in the optical member including the reflection mirror, the condensing lens, and the like and the photodetector are contacted with the receiver portion assembling member. Therefore, by using such a simple method, the photodetector and the optical member can be positioned with respect to each other, thereby making it possible to assemble a two-way optical communication device at low cost.

According to another aspect of the present invention, a method is provided for assembling the two-way optical communication device of the present invention. The light emitting element positioning portion of the optical member and a portion of the light emitting element are positioned with respect each other, or the light emitting element positioning portion of the optical member and a holding portion having the light emitting element attached thereto are positioned with respect each other so as to position the light emitting element and the optical member. Thereby, the above-described objective is achieved.

According to the above-described method, by using the light emitting element positioning portion provided in the optical member including the reflection mirror, the condensing lens, and the like, the photodetector or the holding portion having the light emitting element (submount) and the optical member can be positioned with respect to each other with high precision.

Thus, the invention described herein makes possible the advantages of providing (1) an inexpensive and small-size two-way optical communication device and a two-way optical communication system capable of performing full duplex two-way optical communication using a single optical fiber, in which losses of transmitted light and incoming light are small, the interference between incoming light and transmitted light is suppressed and electrical or electromagnetic noise is suppressed, and light can be coupled to an optical fiber having a large diameter, such as a POF; and (2) a method for assembling the two-way optical communication device.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

A two-way optical communication system and a two-way optical communication device according to Example 1 of the present invention will be described with reference to FIGS. 1 and 2.

Figure 1:
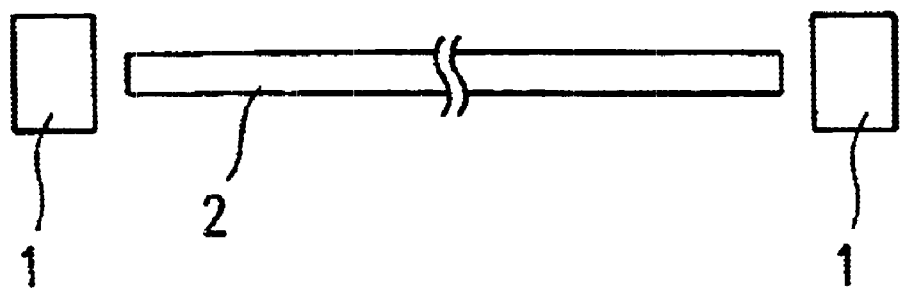
FIG. 1 is a schematic diagram for explaining a configuration of a two-way optical communication system according to Example 1 of the present invention.

FIG. 1 is a schematic diagram for explaining a configuration of a two-way optical communication system 3 according to Example 1 of the present invention. The two-way optical communication system 3 includes an optical fiber 2 and two two-way optical communication devices 1 provided on opposed ends of the optical fiber 2. The optical fiber 2 transmits modulated light having a wavelength which is modulated so as to be suited to transmission based on a data signal to be transmitted.

Figure 2:
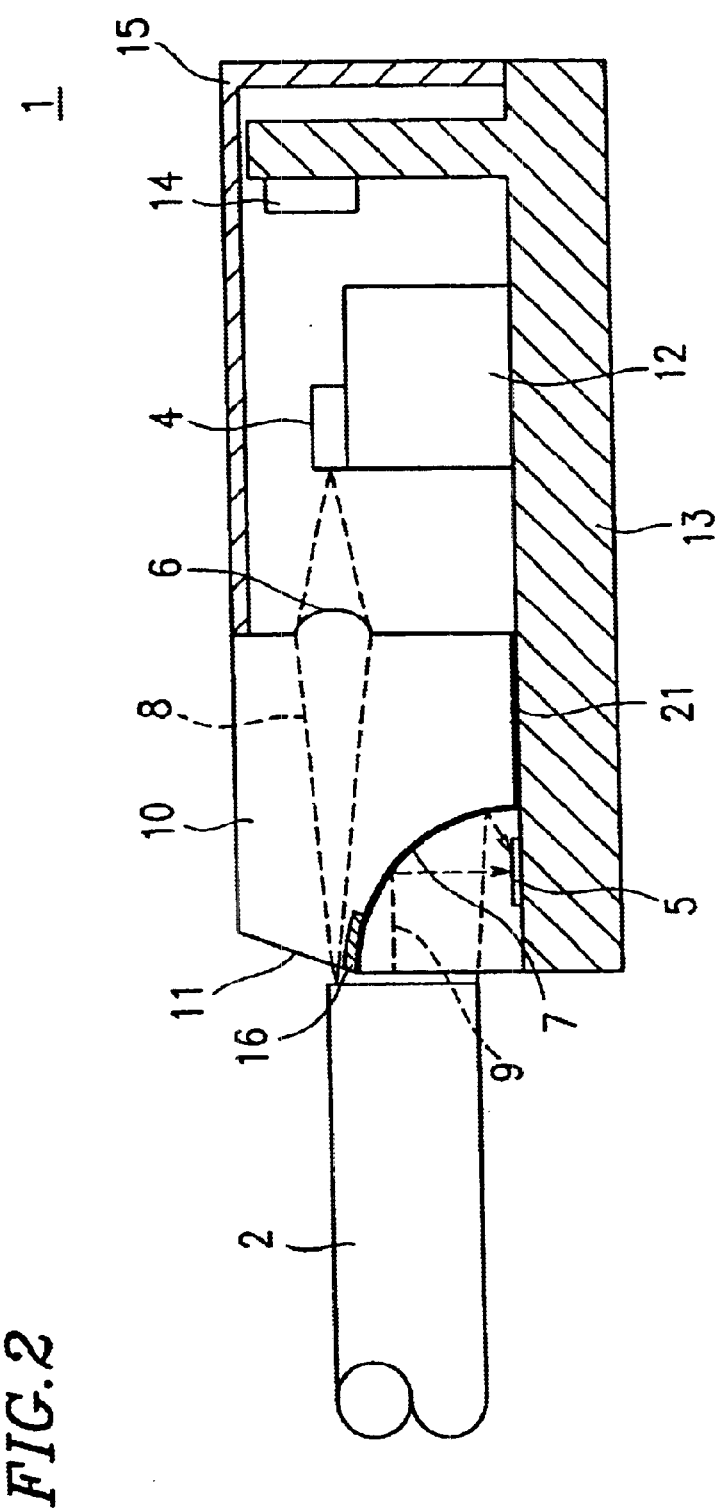
FIG. 2 is a schematic diagram for explaining a configuration of a two-way optical communication device according to Example 1 of the present invention.

FIG. 2 is a schematic diagram for explaining a configuration of the two-way optical communication device 1 of Example 1. The two-way optical communication device 1 includes a light emitting element 4, a photodetector 5, a transmission lens 6, and a reflection mirror 7. The light emitting element 4 generates transmitted light 8 which is modulated based on a data signal. The photodetector 5 receives incoming light 9 emitted from the optical fiber 2 and generates a data signal. The transmission lens 6 condenses the transmitted light 8 emitted from the light emitting element 4 and couples the transmitted light 8 to the optical fiber 2. The reflection mirror 7 reflects the incoming light 9 emitted from the optical fiber 2 and couples the incoming light 9 to the photodetector 5. The transmission lens 6 and the reflection mirror 7 are provided in an optical member 10. The light emitting element 4 is provided on a submount 12 made of SiC or the like which has excellent heat sink characteristics. The optical member 10 and the submount 12 are provided on a stem 13 in such a manner as to be positioned with respect to each other. The stem 13 is electrically connected to a circuit (not shown), such as a circuit for converting incoming light to a data signal and a control circuit.

Hereinafter, each part of the two-way optical communication device 1 will be described.

The optical fiber 2 is preferably a multi-mode optical fiber, such as a POF. A POF includes a core made of a plastic having an excellent transmittance such as PMMA (Polymethyl-Metha-Acrylate) or polycarbonate, and a clad made of a plastic having a refractive index lower than the core. Such an optical fiber can easily have a large core diameter of about 200 $\mu$m to about 1 mm as compared to an optical fiber made of quartz. The coupling adjustment (positioning) between the two-way optical communication device 1 and the optical fiber 2 can be easily carried out, thereby making it possible to obtain the inexpensive two-way optical communication system 3 according to the present invention. When the transmitted light 8 and the incoming light 9 are spatially separated from each other as in Example 1, the core diameter of the optical fiber 2 is preferably 1 mm.

Alternatively, the optical fiber 2 may be a polymer clad fiber (PCF) which includes a core made of quartz and a clad made of a polymer. A PCF is more expensive than a POF, but has a lower transmission loss and a broader transmission band. Therefore, when the PCF is used as a transmission medium, longer-distance communication or faster communication can be carried out in the two-way optical communication system 3.

The light emitting element 4 may be a semiconductor laser or a light emitting diode (LED). A light emitting element is preferable as the light emitting element 4 when light having a wavelength which causes less loss in the optical fiber 2 can be obtained and the manufacturing cost is low. When the optical fiber 2 is a POF, for example, the light emitting element 4 may be a 650 nm-wavelength semiconductor laser which is used in DVD or the like and which is inexpensive due to mass production. Further, a monitoring photodiode 14 may be provided at a back of the light emitting element 4 so that the amount of light emitted from the light emitting element 4 can be monitored and maintained to be constant.

The photodetector 5 may be a photodiode which can convert the intensity of detected modulated light to an electrical signal and has a high sensitivity to the wavelength range of the light emitting element 4. For example, the photodetector 5 may be a PIN photodiode of silicon material, an avalanche photodiode, or the like.

The optical member 10 can be produced with injection molding or the like from a plastic, such as PMMA or polycarbonate. The reflection mirror 7 can be provided in the optical member 10 by providing a metal film having a high reflectance, such as aluminum or gold, on a predetermined portion with a deposition technique. The reflection mirror 7 may be easily provided by depositing a metal film from a lower left side to a portion of the optical member 10 in the shape of a quarter circle hollow as shown in FIG. 2 without patterning using a mask or the like. In Example 1, the reflection mirror 7 is in the shape of a curved surface, which plays a role in condensing the incoming light 9.

An electrode 21 is provided on a bottom surface of the optical member 10 which contacts the stem 13. The electrode 21 is formed along with the reflection mirror 7 with a deposition technique, where at least a part of the electrode 21 is linked to the reflection mirror 7. Further, the optical member 10 includes the transmission lens 6 for condensing the transmitted light 8 and coupling it to the optical fiber 2, and a prism 11 for refracting transmitted light 8 into the optical fiber 2. Further, the optical member 10 functions as a part of a sealing member which seals the light emitting element 4. Since the single optical member 10 has a number of functions, constituent members can be significantly reduced, and an assembly tolerance can be reduced. Therefore, the small two-way optical communication device 1 can be obtained at low cost. Further, the light emitting element 4, the photodetector 5, and the optical member 10 are provided on the single stem 13 in parallel to the optical axis of the optical fiber 2. Therefore, a complicated assembly process is not required, thereby making it possible to reduce the number of steps in the assembly process.

In the two-way optical communication device 1, the transmitted light 8 emitted from the light emitting element 4 radially diverges along with the radiation angle of the light emitting element 4 and, thereafter, is converted and condensed to an arbitrary numerical aperture by the transmission lens 6. Further, the transmitted light 8 propagates through the optical member 10 and is coupled to the optical fiber 2. The incoming light 9 emitted from the optical fiber 2 originating from the other end of the communication is reflected by the reflection mirror 7 toward the photodetector 5, condensed by the reflection mirror 7 having curvature, and coupled to the photodetector 5.

When the transmitted light 8 and the incoming light 9 are spatially separated within the diameter of the optical fiber 2, the incoming light 9 emitted from a portion of the optical fiber 2 from which the transmitted light 8 enters is not coupled to the photodetector 5. Therefore, the portion of the optical fiber 2 from which the transmitted light 8 enters is positioned at a peripheral portion of the optical fiber 2, and has a small area. Thus, the incoming light 9 can be efficiently coupled to the photodetector 5.

The optical member 10 includes the prism 11 which is provided at a surface from which the transmitted light 8 is emitted. The prism 11 is tilted with respect to the optical axis of the optical fiber 2. The prism 11 refracts the transmitted light 8 into the optical fiber 2.

A portion of the reflection mirror 7 (a light blocking portion 16 on which light reflected from the optical fiber 2 strikes, shown as a hatched portion in FIG. 2) is provided in such a manner as to contact or be close to the optical fiber 2. A portion of the transmitted light 8 which enters the optical fiber 2 is reflected by an end surface of the optical fiber 2. The reflected transmitted light 8 at the end surface of the optical fiber 2 is blocked by the light blocking portion 16 of the reflection mirror 7 not to be coupled to the photodetector 5. Therefore, it is possible to prevent interference between the transmitted light 8 of near-end reflection and the incoming light 9. It should be noted that the transmitted light 8 is reflected by the entire reflection mirror 7.

Hereinafter, a method for preventing interference caused by the transmitted light 8 approaching to the incoming light 9 will be described in more detail.

Figure 3:
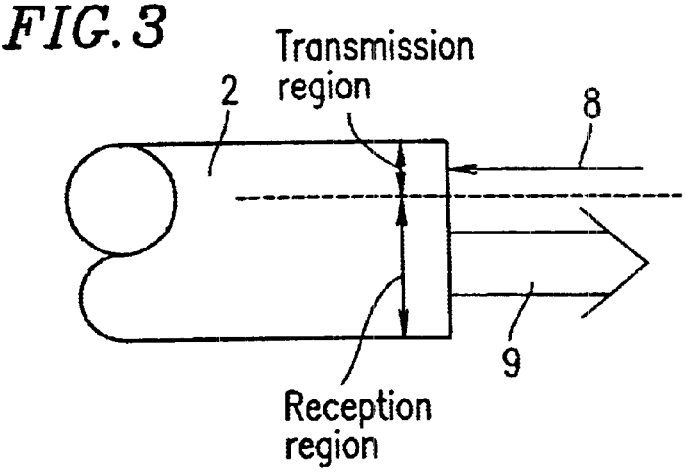
FIG. 3 is a diagram for explaining a transmission region and a reception region in an optical fiber used in a two-way optical communication system of the present invention.

When the transmitted light 8 and the incoming light 9 are spatially separated from each other within the single optical fiber 2, a transmission region of the optical fiber 2 to which the transmitted light 8 is coupled is reduced as shown in FIG. 3 so that a reception region of the optical fiber 2 is enlarged. Therefore, an effective portion of the incoming light 9 is increased, resulting in an efficient two-way optical communication device. In this case, it is important to reduce optical losses while the transmitted light 8 and the incoming light 9 are separated.

When using the conventional method which employs a polarization separation film, there occurs a separation loss of about 3 dB. Also, when using the conventional method which employs a light blocking plate, a large loss occurs due to the thickness of the light blocking plate and the spatial separation between the transmission region and the reception region.

In contrast, in Example 1, transmitted light and incoming light are separated from each other by the reflection mirror 7 made of a thin film. Therefore, a loss due to the light blocking portion can be reduced substantially to zero. Further, the transmitted light 8 can be passed through the vicinity of an end (upper end in FIG. 2) of the reflection mirror 7 made of a thin film. Therefore, the boundary between the transmission region and the reception region is substantially negligible, so that the reception region can be enlarged. Further, the prism 11 is used to refract the transmitted light 8 from a peripheral direction of the optical fiber 2 into the optical fiber 2, so that the reception region can be enlarged, thereby making it possible to separate transmitted light and incoming light with a high level of efficiency.

Figure 4:
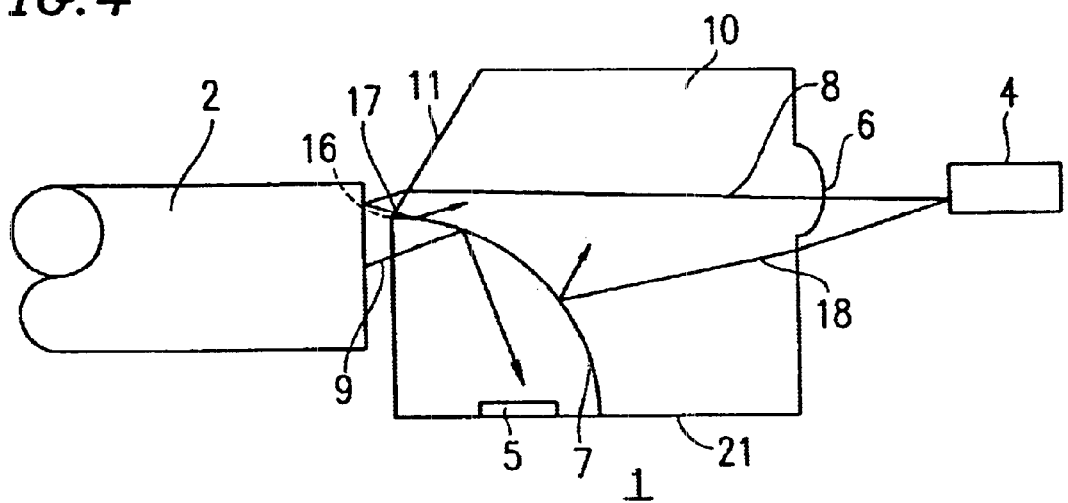
FIG. 4 is a diagram for explaining a principle of prevention of near-end reflection and stray light in a two-way optical communication device of the present invention.

A method for preventing near-end reflection and stray light will be described below with reference to FIG. 4. The transmitted light 8 is refracted by the prism 11 provided in the optical member 10, and coupled to the peripheral portion of the optical fiber 2. A portion of the transmitted light 8 (reflected light 17) is reflected by an end surface of the optical fiber 2 towards the center axis of the optical fiber 2. The light blocking portion 16 is provided at a tip portion of the prism 11 included in the optical member 10 and is a portion of the reflection mirror 7. The light blocking portion 16 contacts the optical fiber 2 or is positioned several tens to several hundreds of micrometers away from the optical fiber 2. Therefore, the reflected light 17 is reflected (blocked) by a surface (rear surface) opposite the surface of the reflection mirror 7 to which the incoming light 9 enters, but does not enter the photodetector 5.

In the conventional techniques, a portion of the transmitted light 8 emitted from the light emitting element 4 does not enter the transmission lens 6 so as to become stray light which is scattered within the two-way optical communication device 1. However, in Example 1 the photodetector 5 is optically separated by the reflection mirror 7 from the optical member 10 provided on the light emitting element 4 side. Therefore, the stray light 18 is reflected by the rear surface of the reflection mirror 7, so that the stray light 18 can be prevented from being coupled to the photodetector 5. Further, even if the assembly tolerance of the light emitting element 4 causes a displacement of the light emitting element 4, the unexpected stray light 18 does not enter the photodetector 5. Therefore, the assembly tolerance of the light emitting element 4 can be large, thereby reducing assembly cost. Furthermore, although in the conventional techniques the reflected light 17 also becomes stray light which is scattered within the two-way optical communication device 1, such stray light is not coupled to the photodetector 5 in Example 1 for the same reason as described above.

Thus, the reflection mirror 7 reflects and condenses the incoming light 9 toward the photodetector 5, and further functions to optically separate the reflected light 17 and the stray light 18 from the photodetector 5. Further, since the photodetector 5 is separated from the light emitting element 4 by the reflection mirror 7, the position of the light emitting element 4 can be determined without concern of an influence of stray light. Therefore, the degree of freedom of design of the two-way optical communication device 1 is increased, making it possible to easily adjust the assembly.

Figure 5:
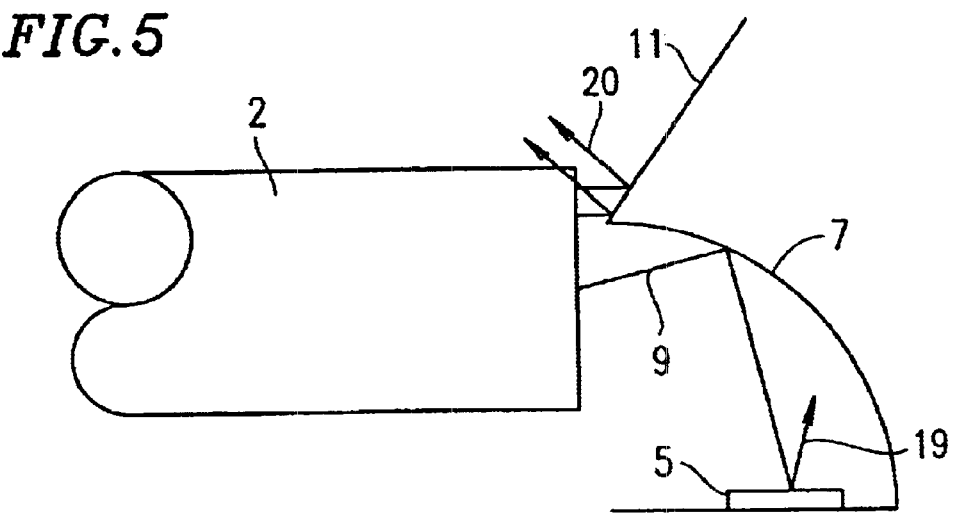
FIG. 5 is a diagram showing a principle of prevention of other-end module reflection in a two-way optical communication device of the present invention.

A method for reducing the other-end module reflection will be described with reference to FIG. 5. Causes of the other-end module reflection in the two-way optical communication device 1 of Example 1 are (1) light reflected by a surface of the photodetector 5 is coupled back to the optical fiber 2 (the light is hereinafter referred to as element-reflected light 19); and (2) a portion of the incoming light 9 emitted from the optical fiber 2 is reflected by an illuminated surface of the optical member 10 (mainly, the prism 11), and then coupled back to the optical fiber 2 (the light is hereinafter referred to as prism-reflected light 20).

The photodetecting surface of the photodetector 5 typically includes an antireflection coating, such as a thin film of silicon nitride or the like, thereby preventing the reflection of the incoming light 9 to improve photodetecting efficiency. All portions of the incoming light 9 do not enter the photodetecting surface, where some portion of the incoming light 9 enters other than the photodetecting surface to be reflected. Such element-reflected light 19 is responsible for the other-end module reflection. Therefore, an antireflection film, such as black-colored resist, whose optical absorption is high with respect to an operation wavelength range and whose reflectance is low, is provided in regions other than the photodetecting surface. Thereby, it is possible to more reliably suppress the other-end module reflection.

The prism-reflected light 20 can be prevented from being coupled to the optical fiber 2, even if entering the optical fiber 2, by optimizing the angle of the tilt of the prism 11. Thereby, the prism-reflected light 20 is not transmitted as communication light. To this end, the prism-reflected light 20 needs to enter the optical fiber 2 at an angle which is greater than the numerical aperture of the optical fiber 2. That is, the tilt angle of the prism 11 with respect to the optical axis is set to be greater than or equal to the numerical aperture of the optical fiber 2. For example, when the optical fiber 2 has a numerical aperture of about 0.3, the tilt angle of the prism 11 is set to be greater than or equal to about 10°, and more preferably greater than or equal to about 17°. However, as the tilt angle of the prism 11 increases, the incident angle of the transmitted light 8 to the optical fiber 2 also increases, so that a coupling loss of the transmitted light 8 may increase. Therefore, the tilt angle of the prism 11 needs to be designed by taking into account a tradeoff between the blocking of the prism-reflected light 20 and the coupling loss of the transmitted light 8.

Figure 6:
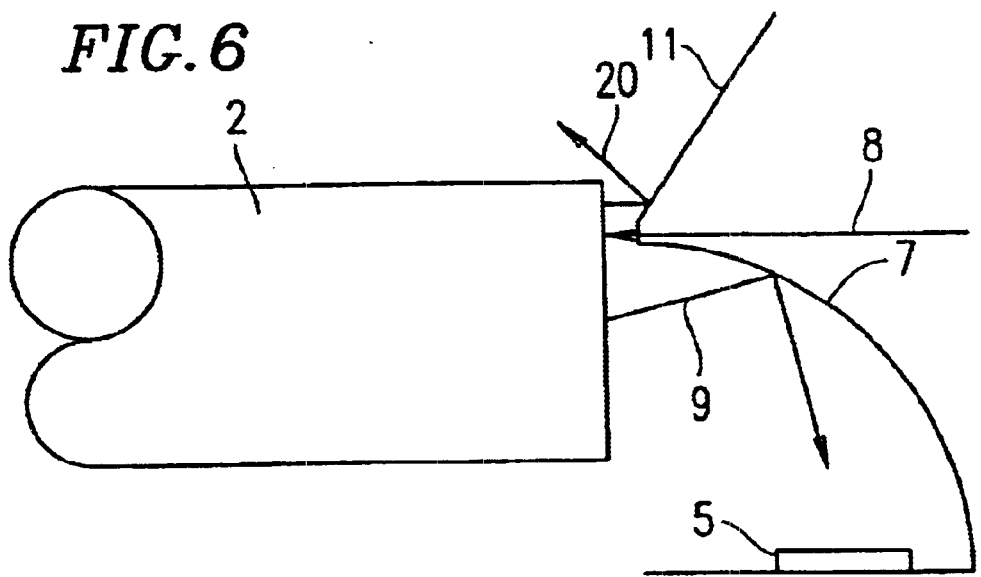
FIG. 6 is a diagram showing a principle of prevention of other-end module reflection in a two-way optical communication device of the present invention.

Referring to FIG. 6, in order to prevent a further increase in the coupling loss of the transmitted light 8, the prism 11 may not be provided at a portion which the transmitted light 8 propagates through, but the prism 11 having a large tilt angle may be provided at a portion which the transmitted light 8 does not propagate through. In this case, the reflection light 20 from the portion at which the prism 11 is not provided becomes the other-end module reflection. However, an influence of the other-end module reflection can be reduced by sufficiently decreasing the area of such a portion. Alternatively, the tilt angle of the prism 11 may be produced in two levels so that the tilt angle of a portion of the prism 11 through which the transmitted light 8 propagates is small and the other portion of the prism 11 is large. Still alternatively, an antireflection coating may be provided at a surface of the optical member 10 illuminated by the incoming light 9 (i.e., a surface on which the prism 11 is provided), thereby reducing the reflectance.

Figure 7:
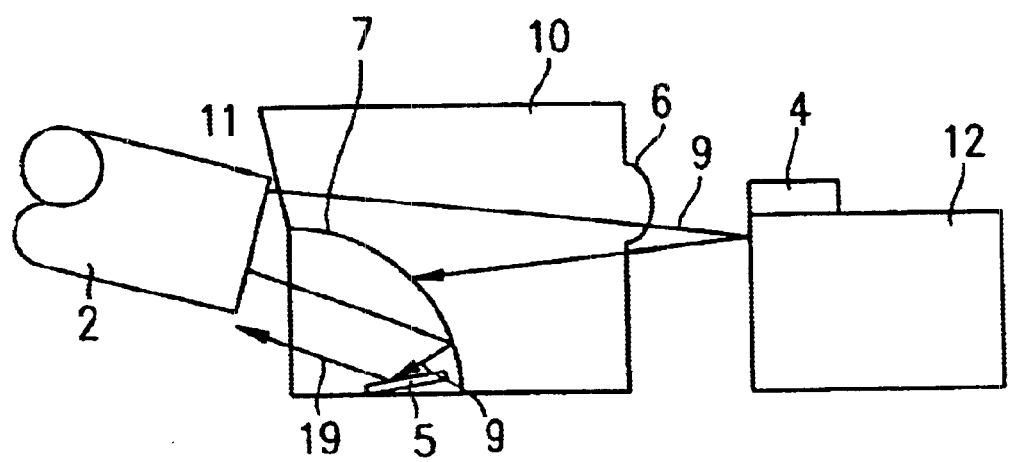
FIG. 7 is a diagram showing a principle of prevention other-end module reflection in a two-way optical communication device according to Example 1 of the present invention.

A portion of the incoming light 9 emitted from the optical fiber 2 propagates through the optical member 10 to illuminate the light emitting element 4 or the submount 12. Such incoming light 9 is reflected by the light emitting element 4 or the submount 12 to cause the other-end module reflection. The optical axis of the light emitting element 4, or the submount 12 may be tilted with respect to the optical axis of the optical fiber 2 as shown in FIG. 7, for -example. With such a configuration, the incoming light 9 reflected from the light emitting element 4 or the submount 12 can be prevented from being coupled back to the optical fiber 2. Similarly, by tilting the photodetecting surface of the photodetector 5 with respect to the optical axis of the optical fiber 2, the element-reflected light 19 of the photodetector 5 is prevented from being coupled to the optical fiber 2, thereby reducing the other-end module reflection. The tilt angle of the photodetecting surface of the photodetector 5 with respect to the optical fiber 2 can be appropriately adjusted by the shape and position of the reflection mirror 7. The tilt angle of the optical axis of the light emitting element 4, or the submount 12 with respect to the optical axis of the optical fiber 2 can be appropriately adjusted by the shape and position of the transmission lens 6.

A method for reducing far-end reflection will be described below. When the end surface of the optical fiber 2 is perpendicular to the optical axis of the optical fiber 2 as shown in FIG. 2, about 4% of transmitted light causes far-end reflection. Such far-end reflection can be reduced by modifying the shape of the end surface of the optical fiber 2.

Figure 8:
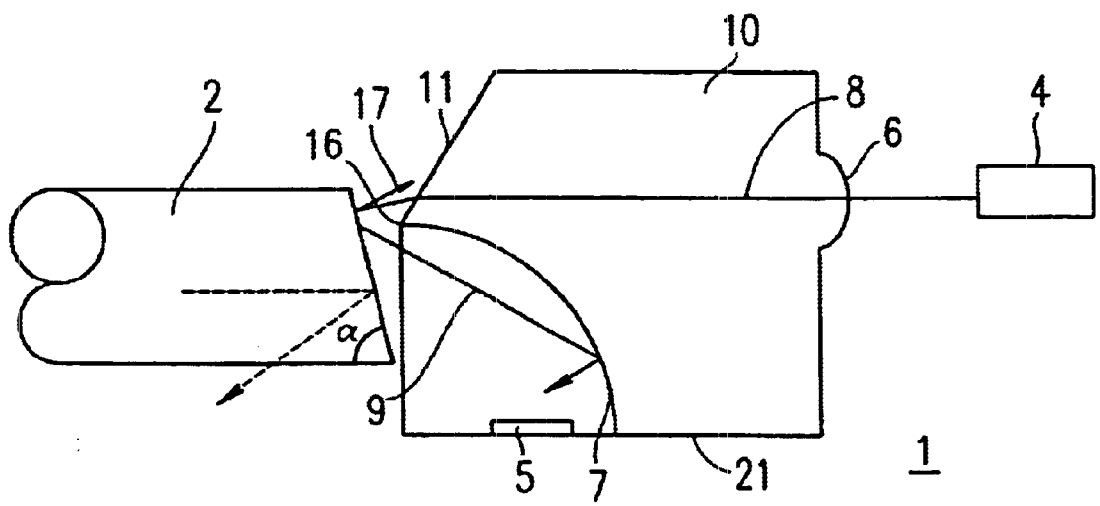
FIG. 8 is a diagram showing a two-way optical communication device according to Example 1 of the present invention in which an end surface of an optical fiber is tilted with respect to an optical axis of the optical fiber.
Figure 9:
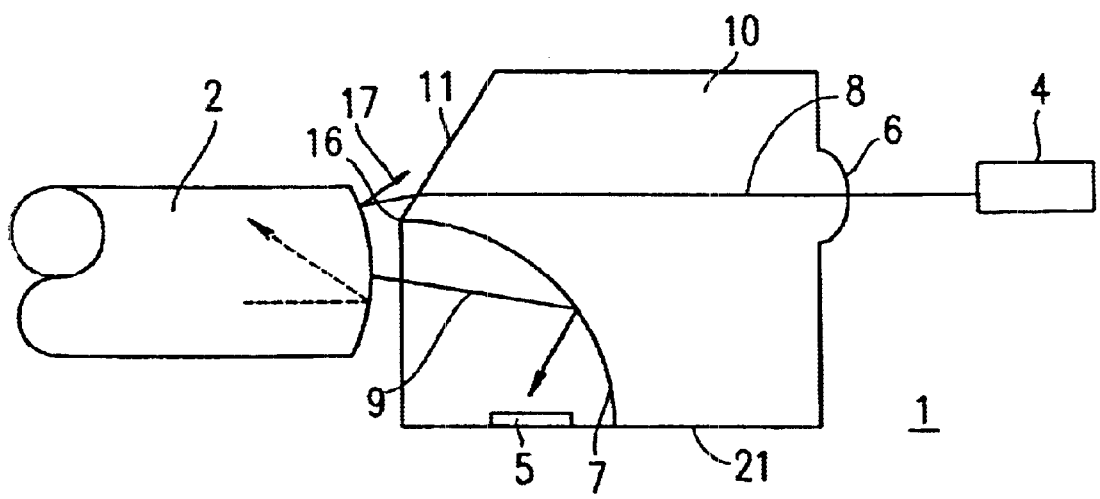
FIG. 9 is a diagram showing a two-way optical communication device according to Example 1 of the present invention in which an end surface of an optical fiber is in the shape of a spherical surface.

For example, the end surface of the optical fiber 2 may be tilted with respect to the optical axis of the optical fiber 2 as shown in FIG. 8. Alternatively, the end surface of the optical fiber 2 may be in the shape of a spherical surface as shown in FIG. 9. In either case, the angle of the far-end reflection at the end surface of the optical fiber 2 is modified so as to be greater than or equal to the numerical aperture of the optical fiber 2, thereby preventing incoming light of far-end reflection from propagating through the optical fiber 2. For example, in the case of a POF, the end surface can be modified to a tilted or spherical surface by pressing the end surface to a hot plate having an arbitrary shape so as to be melted. A description will be given of an optical coupling state between the two-way optical communication device 1 and the optical fiber 2 when the shape of the end surface of the optical fiber 2 is modified in the above-described manner.

When the end surface of the optical fiber 2 is tilted, the optical fiber 2 is coupled with the two-way optical communication device 1 in such a manner that the corner of the profile of the optical fiber 2 at the side which the transmission light 8 enters has an obtuse angle as shown in FIG. 8. In this case, the transmitted light 8 reflected by the optical fiber 2 (the reflected light 17 [near-end reflection]) is directed in a peripheral direction of the optical fiber 2. Therefore, the reflected light 17 is not coupled to the photodetector 5 without the light blocking portion 16 being provided at a position corresponding to the peripheral portion of the optical fiber 2 (upper portion of FIG. 8), thereby making it possible to enlarge the reception region. Further, incoming light propagating through the optical fiber 2 (indicated by a dashed line in FIG. 8) is reflected by the end surface of the optical fiber 2 (far-end reflection), but such reflected light has a large angle with respect to the optical axis, so that a loss of the reflected light within the optical fiber 2 is large. Therefore, an influence of the far-end reflection can be reduced. Furthermore, the incoming light 9 emitted from the optical fiber 2 is refracted toward the photodetector side (downward in FIG. 8) due to the tilt of the end surface of the optical fiber 2, thereby making it possible to improve reception efficiency. In this case, the tilt angle of the end surface of the optical fiber 2 is set to be equal to about the numerical aperture of the optical fiber 2, thereby making it possible to reliably reduce far-end reflection. For example, when the tilt angle α of the optical fiber 2 having a numerical aperture of about 0.3 is set to about 80°, the far-end reflection can be reduced to about 0.4%.

When the end surface of the optical fiber 2 is in the shape of a spherical surface as shown in FIG. 9, the orientation of the optical fiber 2 with respect to the two-way optical communication device 1 does not need to be specified, as is different from the case of the tilted surface. Therefore, the optical fiber 2 (a plug to which the optical fiber 2 is fixed) can be easily inserted or extracted. Similar to the tilted surface, when the transmitted light 8 enters a peripheral portion of the optical fiber 2, the reflected light 17 is directed to a peripheral direction of the optical fiber 2, thereby making it possible to enlarge the reception region. Thus, far-end reflection (indicated by a dashed line in FIG. 9) can also be reduced. Further, a portion of the incoming light 9 emitted from the optical fiber 2 is condensed by the spherical surface (end surface) thereof, thereby making it possible to improve reception efficiency.

Figure 10:
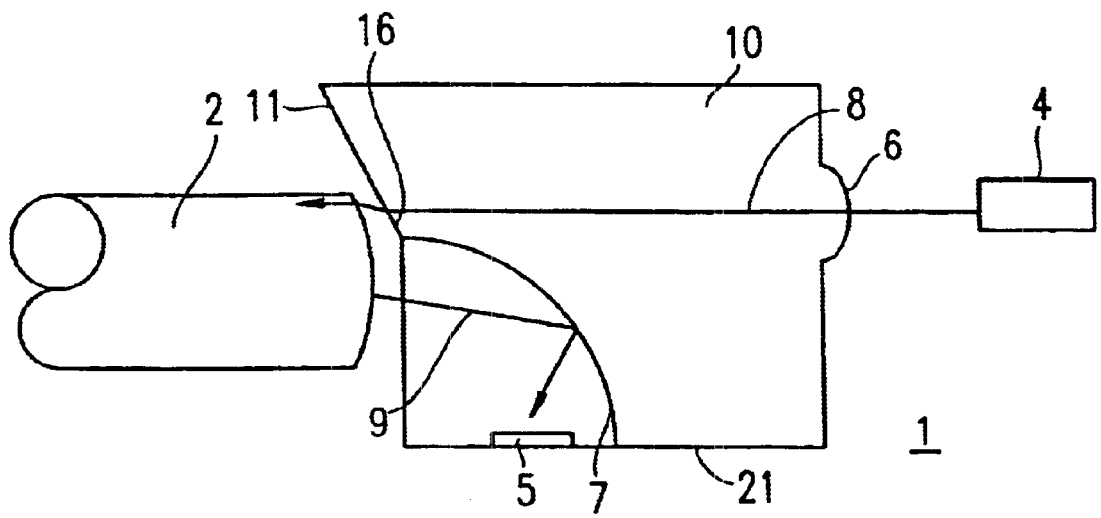
FIG. 10 is a diagram showing a two-way optical communication device according to Example 1 of the present invention in which a prism has another shape.

Furthermore, when the end surface of the optical fiber 2 is a tilted or spherical surface, the transmitted light 8 entering the optical fiber 2 is refracted in accordance with the shape of the end surface. Therefore, the angle of the refracted transmitted light 8 with respect to the optical axis of the optical fiber 2 needs to be reduced in order to improve the coupling efficiency of the transmitted light 8 with the optical fiber 2. To this end, the prism 11 is preferably tilted in a direction reverse to that of FIG. 2, as shown in FIG. 10.

As described above, when the end surface of the optical fiber 2 is in the shape of a tilted or spherical surface, the far-end reflection can be reduced and the reception efficiency can be improved.

A method for reducing electrical or electromagnetic interference will be described below with reference to FIG. 2. In this case, the stem 13 is connected to a ground electrode of the photodetector 5. The submount 12 is made of an insulator such as SiC. The light emitting element 4 and the photodetector 5 are electrically separated from each other. Further, the reflection mirror 7 is also provided at a bottom of the optical member 10 as an electrode 21. The reflection mirror 7 is electrically connected via the electrode 21 to the stem 13. When viewing from the light emitting element 4 side, the photodetector 5 is shielded by the reflection mirror 7, the electrode 21 and the stem 13, thereby suppressing electrical or electromagnetic interference. The reflection mirror 7 is provided by depositing a conductive material having a high reflectance, such as aluminum or gold, on the optical member 10 from the lower left side. Meanwhile, the electrode 21 is formed. Since the reflection mirror 7 and the electrode 21 are provided on the entire bottom surface of the optical member 10, the formation of these elements can be easily performed without patterning using a mask or the like.

Further, the light emitting element 4 and the monitoring photodiode 14 are covered with a transmission cover 15. The transmission cover 15 is attached to the optical member 10 and the stem 13, thereby shielding the light emitting element 4 from the outside. The transmission cover 15 is electrically connected to the stem 13, thereby electromagnetically shielding the light emitting element 4 from the outside. Further, a portion of the optical member 10 is used as a portion of the shielding member for shielding the light emitting element 4 (corresponding to a typical cover glass), thereby making it possible to reduce the number of parts, thereby reducing parts cost as well as to simplify the manufacturing process.

Figure 11:
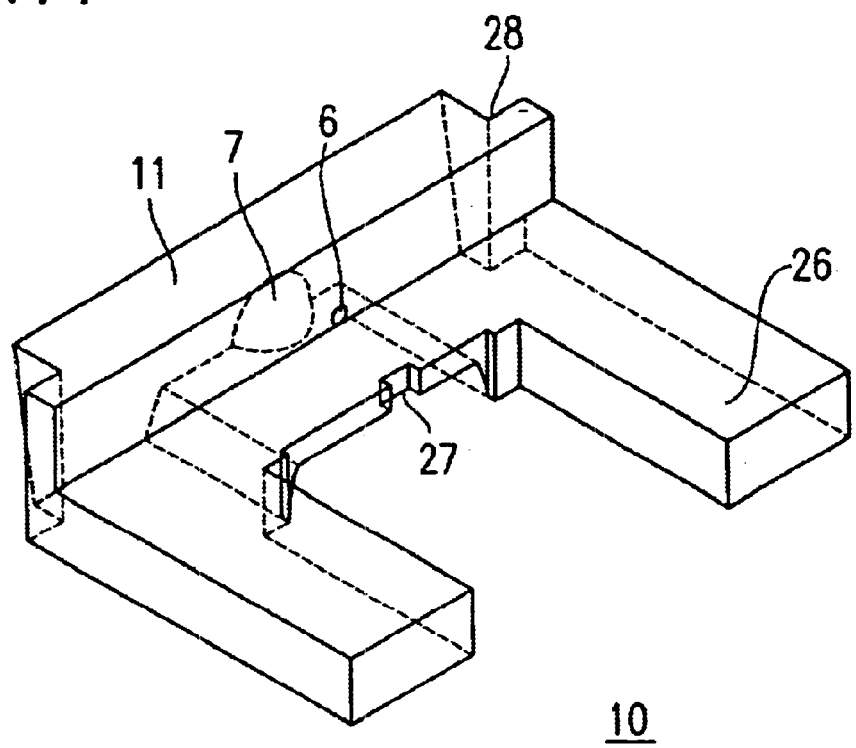
FIG. 11 is a diagram showing a shape of an optical member included in a two-way optical communication device according to Example 1 of the present invention.

The optical member 10 will be described below in more detail. FIG. 11 is a perspective view showing an exemplary structure of the optical member 10 of Example 1. The optical member 10 includes the above-described transmission lens 6, the reflection mirror 7 in the shape of a curved surface, and the prism 11 whose surface is tilted with respect to the optical axis of the light emitting element 4. Further, the optical member 10 includes a fixing portion 26 which is fixed to the stem 13. Still further, the optical member 10 includes a light emitting element positioning portion 27 which sets a relative position of the light emitting element 4 with respect to the optical member 10, and a photodetector positioning portion 28 which sets a position of the photodetector 5 with respect to the optical member 10, both of which are in the shape of a corner, a notch, or the like.

The light emitting element positioning portion 27 and the photodetector positioning portion 28 are provided at arbitrary positions of the optical member 10. When assembling the two-way optical communication device 1, these portions are used as references. Thus, the positioning portions 27 and 28 used as assembly references are provided in the optical member 10 in which the reflection mirror 7 for condensing the incoming light 9 and the transmission lens 6 for condensing the transmitted light 8 are provided, thereby making it possible to position the photodetector 5 and the light emitting element 4 with respect to the optical member 10 with high precision. Further, it is possible to easily assemble the two-way optical communication device 1.

Next, a method for assembling the two-way optical communication device 1 of Example 1 will be described.

For the assembly of the two-way optical communication device 1, it is important to determine the relative positions of the photodetector 5 and the reflection mirror 7 and the relative positions of the light emitting element 4 and the transmission lens 6 with high precision and with an easy method.

Figure 12:
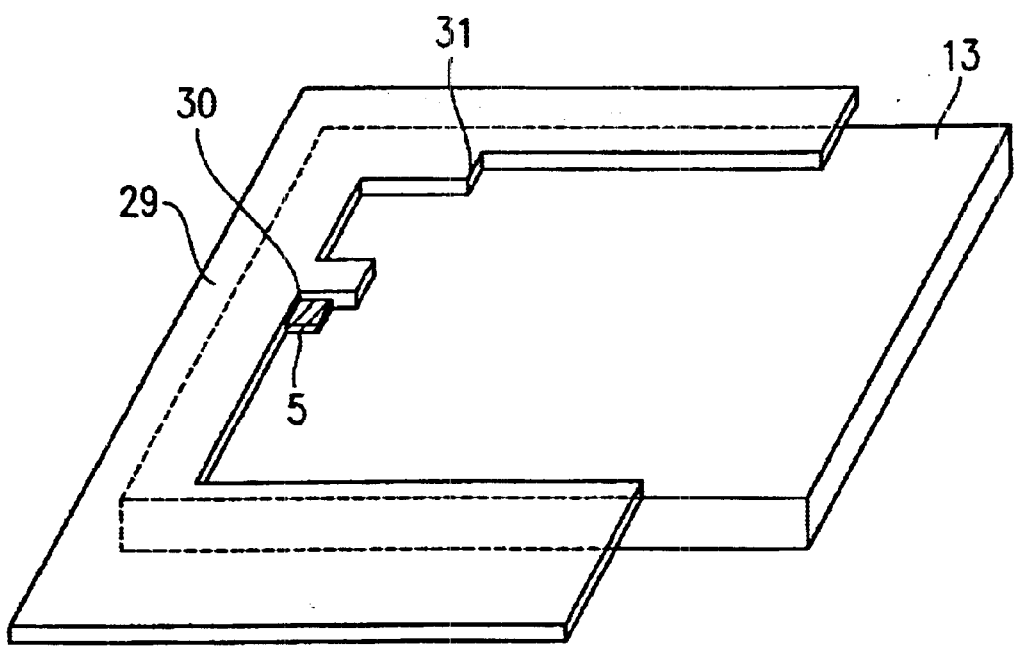
FIG. 12 is a diagram for explaining a method for assembling a two-way optical communication device according to Example 1 of the present invention.

A method for positioning the photodetector 5 and the reflection mirror 7 (the optical member 10 including the reflection mirror 7) will be described. As shown in FIG. 12, a receiver assembly member 29 for positioning the photodetector 5 and the reflection mirror 7 is fixed to the stem 13. The receiver assembly member 29 includes an optical portion position 31 for positioning the optical member 10 and the photodetector 5, both of which are a corner or a notch. The photodetector 5 is attached to the stem 13 in such a manner as to join the circumference of the photodetector 5 to the photodetecting portion position 30 of the receiver assembly member 29. The photodetector 5 is connected to a preamplifier (not shown) with wire bonding. Thereafter, the photodetector positioning portion 28 of the optical member 10 is attached to the stem 13 in such a manner as to be joined to the optical portion position 31 of the receiver assembly member 29. Subsequently, the receiver assembly member 29 is removed. The receiver assembly member 29 is reused to assemble other two-way optical communication devices 1.

The relative positions of the photodetecting portion position 30 and the optical portion position 31 in the receiver assembly member 29 is determined with high precision. The assembly tolerance for this assembly method is, for example, calculated from the following. The outside tolerance of the photodetector 5 is about 20 $\mu$m. The molding tolerance of the optical member 10 is about 20 $\mu$m. The processing tolerance of the receiver assembly member 29 is about 5 $\mu$m. The positional tolerance between the photodetector 5 and the optical member 10 is about 20 $\mu$m. In this case, the assembly tolerance is a total of about 65 $\mu$m.

According to this assembly method, the processing tolerance of the stem 13 which is about 50 $\mu$m can be reduced as compared to a conventional case where placement reference positions for the photodetector 5 and the optical member 10 are provided on the stem 13. Further, since the photodetector positioning portion 28 is provided directly in the optical member 10, it is possible to assemble the two-way optical communication device 1 with high precision by enhancing the precision of the relative positions of the reflection mirror 7 and the photodetector positioning portion 28 at the time of formation. Furthermore, each part can be placed while being pressed to the receiver assembly member 29 to assemble the two-way optical communication device 1 easily as compared to the case where positioning is carried out using a microscope or the like.

Hereafter, a method for positioning the light emitting element 4 and the transmission lens 6 (the optical member 10 including the transmission lens 6) will be described. With the above-described assembly of the receiver portion, the optical member 10 is already provided on the stem 13. The light emitting element 4 is attached to the stem 13 in such a manner that a portion of the light emitting element 4 (a light emitting point or an outer portion) joins to the light emitting element positioning portion 27 provided in the optical member 10. Alternatively, the light emitting element 4 is previously attached to the submount 12, and the submount 12 is attached to the stem 13 in such a manner to be joined to the light emitting element positioning portion 27.

According to this assembly method, since the light emitting element positioning portion 27 is provided in the optical member 10 including the transmission lens 6, the positioning between the light emitting element 4 and the transmission lens 6 can be carried out with high precision. Therefore, the light emitting element 4 can be indirectly positioned with respect to the transmission lens 6 by joining the light emitting element 4 to the light emitting element positioning portion 27, thereby making it possible to easily assemble the two-way optical communication device 1.

As described above, the transmission and reception optical systems and the positioning portion for the light emitting element and the photodetector are provided in a single optical member 10, thereby making it possible to reduce the number of parts and easily assemble the two-way optical communication device 1.

As described above, when the two-way optical communication device 1 of Example 1 is used as at least one of the two-way optical communication devices included in the two-way optical communication system 3, the interference between transmitted light and incoming light due to near-end reflection, far-end reflection, other-end module reflection, and/or stray light can be prevented and, further, electrical or electromagnetic interference can be reduced. Therefore, full duplex two-way optical communication can be performed using the single optical fiber 2.

Further, the single optical member 10 has a number of functions, thereby making it possible to obtain a small-size and easy-to-manufacture two-way optical communication device 1 at low cost.

Figure 13:
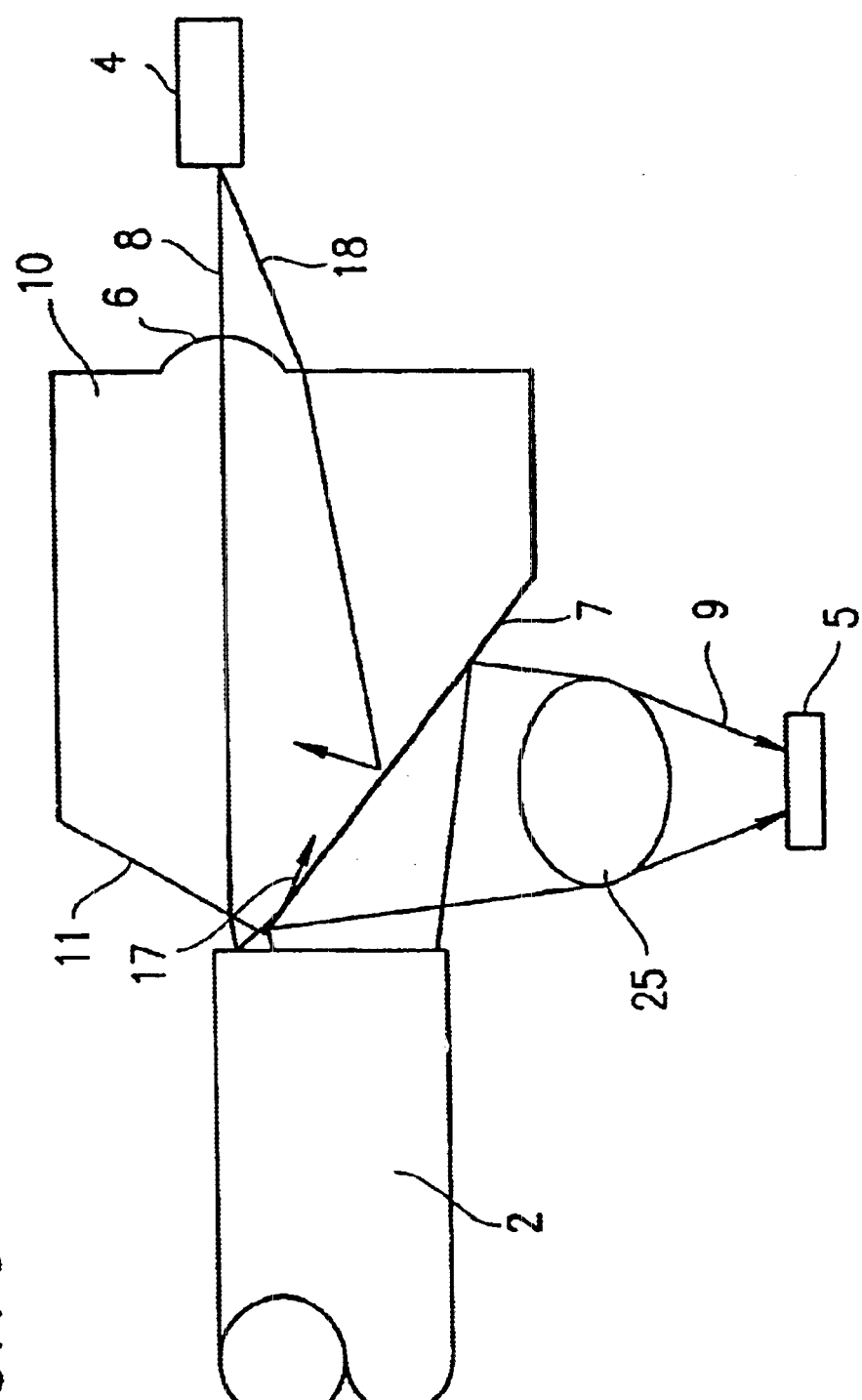
FIG. 13 is a diagram showing a two-way optical communication device according to Example 1 of the present invention in which a reflection mirror has another shape.

It should be noted that the reflection mirror 7 is not limited to be in the shape of a curved surface, but may be in the shape of a flat surface as shown in FIG. 13. In this case, since the reflection mirror 7 does not have a function to condense the incoming light 9, an additional reception lens 25 is provided to condense the incoming light 9 to the photodetector 5. In such a configuration, although a problem arises that the number of parts is increased, thereby raising cost, the distance between the light emitting element 4 and the photodetector 5 can be elongated. Therefore, electric and electromagnetic noise can be easily reduced. Especially when a high-speed operation is required, the flat surface reflection mirror 7 is useful. The same is true of the following Examples 2 and 3.

EXAMPLE 2

Hereinafter, a two-way optical communication device according to Example 2 of the present invention will be described with reference to FIG. 14. In Example 2, parts having the same functions as those of the parts of Example 1 are designated by the same numeral references and thus description thereof is omitted.

Figure 14:
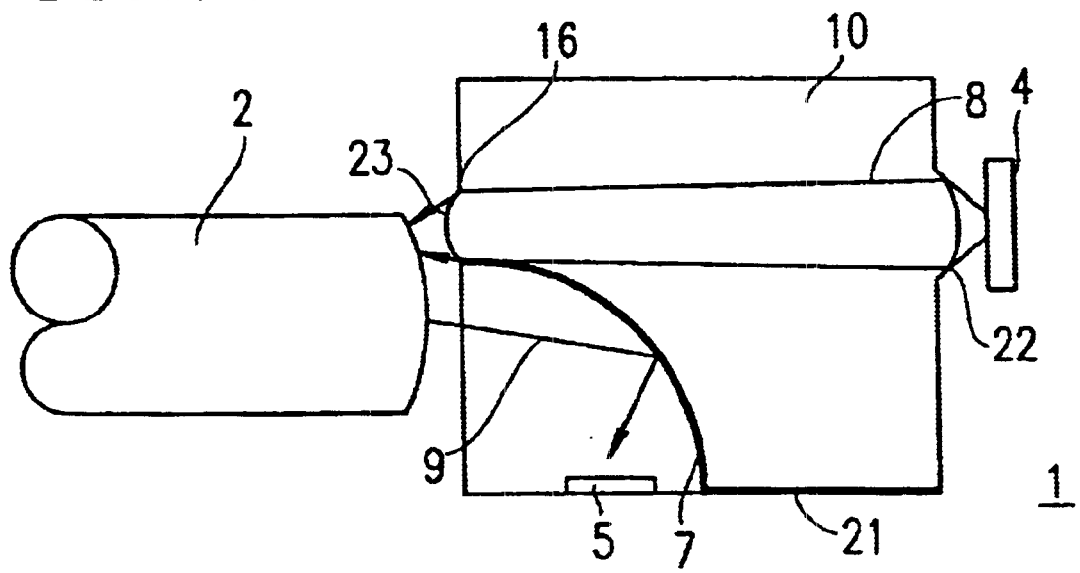
FIG. 14 is a schematic diagram for explaining a configuration of a two-way optical communication device according to Example 2 of the present invention.

FIG. 14 is a schematic diagram showing a configuration of a two-way optical communication device 1 according to Example 2 of the present invention. The two-way optical communication device 1 includes a light emitting element 4 of a plane emission type, such as a light emitting diode (LED) and a plane emission type laser. Transmitted light 8 emitted from the light emitting element 4 is condensed by a first transmission lens 22 provided in an optical member 10, propagates through the optical member 10 and is further condensed by a second transmission lens 23 provided in the optical member 10, and is finally coupled to an optical fiber 2.

When an LED is used as the light emitting element 4, an expensive driving device as necessary for a semiconductor laser is not required, thereby obtaining a low-cost two-way optical communication device 1. However, LEDs have a large angle of radiation compared to semiconductor lasers, and a light emitting portion having a large area. Therefore, the light emitting portion needs to be disposed close to a transmission lens in order to be coupled with the transmission lens with high efficiency. Unfortunately, when the transmission lens is close to the light emitting portion, emitted light cannot be sufficiently condensed.

Therefore, two lenses, i.e., the first transmission lens 22 and the second transmission lens 23 are employed in Example 2, whereby the transmitted light 8 is easily condensed even when an LED is used as the light emitting element 4, thereby improving transmission efficiency. In this case, although the effect of preventing the other-end module reflection by the tilt angle of the prism 11 of Example 1 is no longer obtained, incoming light 9 illuminating the second transmission lens 23 is scattered and reflected, thereby obtaining the same effect as obtained by the prism 11.

As described above, when the two-way optical communication device 1 of Example 2 is used as at least one of the two-way optical communication devices included in the two-way optical communication system 3, the transmitted light 8 can be coupled to the optical fiber 2 with high efficiency even when using an inexpensive LED. Further, when a plane emission laser is used in a similar configuration, high-speed driving which is difficult to realize using an LED can be carried out.

It should be noted that although in Example 2 the optical fiber 2 has an end surface in the shape of a spherical surface, the end surface may be a flat surface perpendicular to the optical axis similar to Example 1, or alternatively a flat surface tilted with respect to the optical axis. The end surface of the optical fiber 2 in the shape of a spherical or tilted surface can lead to the same effects as described in Example 1.

In Examples 1 and 2, the reflection mirror 7 made of a thin film is provided in the optical member 10 by deposition. The present invention is not limited to this. The reflection mirror 7 may be provided by sputtering or the like. Further, an optical absorbing layer made of black resist or the like may be provided between the optical member 10 and the reflection mirror 7 (at a part or an entire surface opposite the photodetector 5 of the reflection mirror 7). In this case, transmitted light emitted from the light emitting element 4 or transmitted light reflected by the end surface of the optical fiber 2 is absorbed by the optical absorbing layer, thereby making it possible to prevent the transmitted light from entering the photodetector 5.

EXAMPLE 3

A two-way optical communication device according to Example 3 of the present invention will be described with reference to FIG. 15. In Example 3, parts having the same functions as those of the parts of Examples 1 and 2 are designated by the same numeral references and thus a description thereof is omitted.

Figure 15:
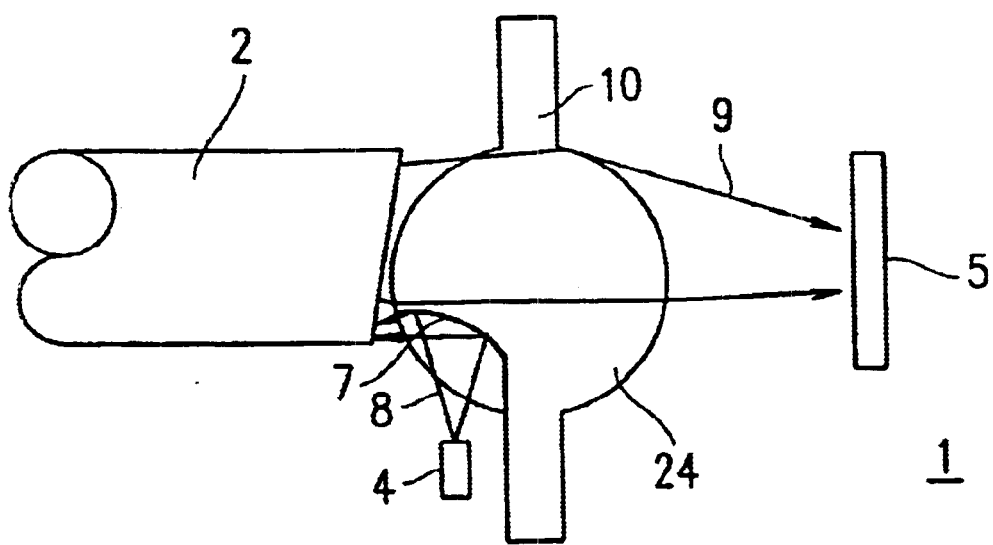
FIG. 15 is a schematic diagram for explaining a configuration of a two-way optical communication device according to Example 3 of the present invention.
Figure 16:
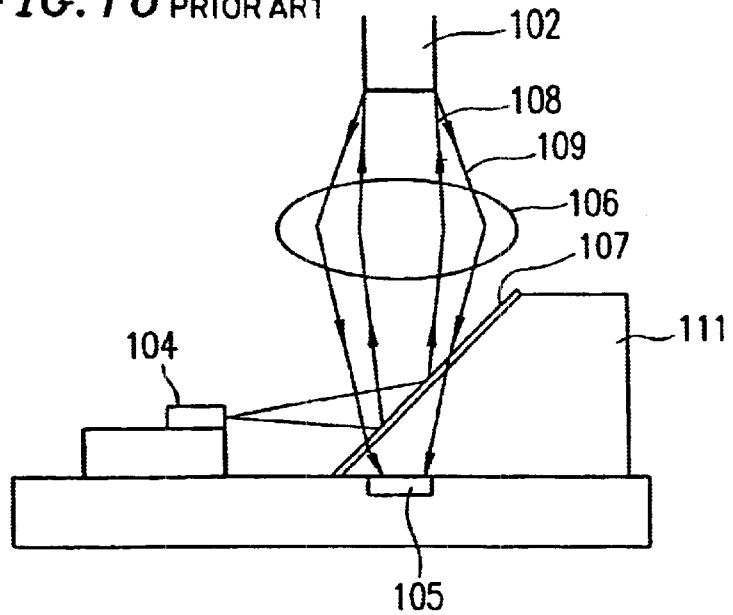
FIG. 16 is a diagram showing an exemplary conventional two-way optical communication device.
Figure 17:
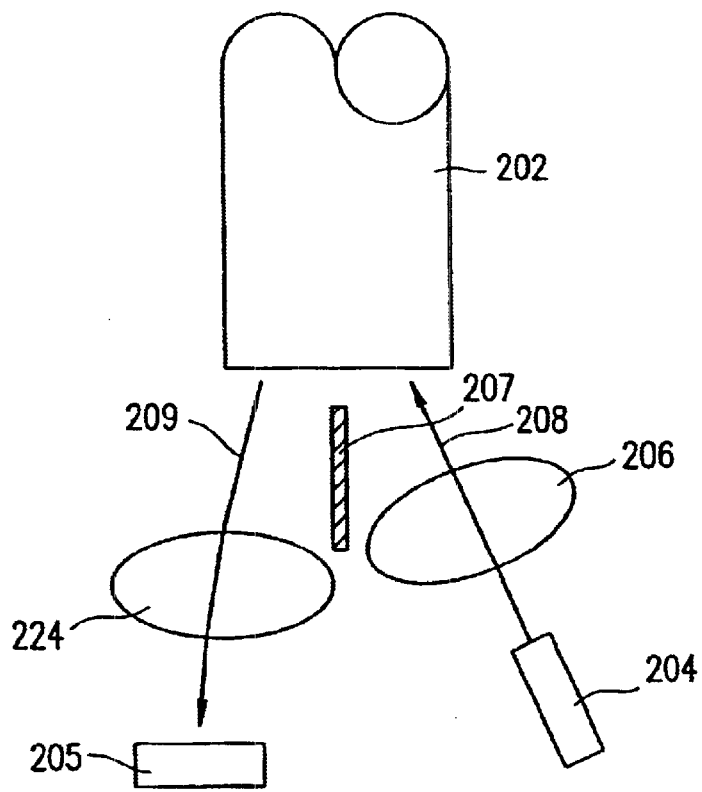
FIG. 17 is a diagram showing another exemplary conventional two-way optical communication device.

FIG. 15 is a schematic diagram showing a configuration of a two-way optical communication device according to Example 3 of the present invention. Comparing the two-way optical communication device 1 of Example 3 with those of Examples 1 and 2, the light emitting element 4 and the photodetector 5 have changed their respective positions. With such a configuration, transmitted light 8 emitted from the light emitting element 4 is reflected and condensed by the reflection mirror 7 having a curvature provided in the optical member 10, and coupled to the optical fiber 2. Incoming light 9 is condensed by a reception lens 24 provided in the optical member 10, and coupled to a photodetector 5.

In the configuration, the transmitted light 8 of near-end reflection at the end surface of the optical fiber 2 is blocked by the reflection mirror 7, and is not coupled to the photodetector 5. Further, stray light also is not coupled to the photodetector 5. Furthermore, even if the incoming light 9 is reflected by the photodetector 5, the reflected incoming light 9 is diverged by the curvature of the reception lens 24, thereby making it possible to reduce an influence of other-end module reflection.

It should be noted that although in Example 3 the end surface of the optical fiber 2 is tilted with respect to the optical axis, the end surface of the optical fiber 2 may be perpendicular to the optical axis or in the shape of a spherical surface, similar to Example 1. The end surface of the optical fiber 2 in the shape of a spherical surface or a tilted surface can lead to the same effects as described in Example 1.

Further, when a photodetecting surface of the photodetector 5 is tilted with respect to a direction perpendicular to the optical axis of the optical fiber 2, it is possible to prevent the incoming light 9 reflected from the photodetecting surface from being coupled to the optical fiber 2, thereby reducing the other-end module reflection, as described in Example 1. Similarly, when the optical axis of the light emitting element 4 is tilted with respect to a direction perpendicular to the optical axis of the optical fiber 2, the incoming light 9 reflected from the light emitting element 4 is prevented from being coupled to the optical fiber 2, thereby making it possible to reduce the other-end module reflection.

Further, as described in Example 1, a photodetector positioning portion 28 and a light emitting element positioning portion 27 may be provided in a portion of the optical member 10, which are used to position the photodetector 5 and the light emitting element 4.

As described above, when the two-way optical communication device 1 of Example 3 is used as at least one of the two-way optical communication devices included in the two-way optical communication system 3, the interference between transmitted light and incoming light due to near-end reflection, far-end reflection, other-end module reflection, and/or stray light can be prevented, thereby obtaining a highly efficient two-way optical communication system 3.

As described above in detail, according to the present invention, transmitted light reflected by an optical fiber and incoming light are separated by a reflection mirror which guides the incoming light to a photodetector, thereby making it possible to prevent interference due to near-end reflection and reduce the number of parts. Further, since such separation is achieved by the reflection mirror made of a thin film, a reception region can be large so that separation loss can be minimized. Furthermore, stray light can be prevented from entering the photodetector which causes interference.

According to the present invention, in addition to the above-described effects, stray light within the two-way optical communication device can be absorbed, thereby further preventing interference.

According to the present invention, since incoming light is condensed by a reflection mirror, an additional condensing lens is not required. Therefore, the number of parts is reduced, thereby making it easy to adjust assembly.

According to the present invention, a transmitter portion and a receiver portion are optically separated by a reflection mirror made of a thin film. Therefore, transmission light is passed in the vicinity of the receiver portion, thereby minimizing the boundary between a transmission region and a reception region and therefore reducing the size of a two-way optical communication device.

According to the present invention, a condensing optical system for transmission and reception can be constructed by a single optical member, resulting in a small-size, inexpensive, and easy-to-assemble two-way optical communication device.

According to the present invention, transmitted light is refracted by a prism so as to enter an optical fiber from a peripheral direction, thereby making it possible to enlarge the reception region of an optical fiber. Further, by using the prism, interference due to other-end module reflection can be suppressed. Furthermore, the degree of freedom of positioning of a light emitting element can be increased. The prism is integrated into the optical member, thereby obtaining a small-size and easy-to-assemble two-way optical communication device.

According to the present invention, the optical member functions as a cover glass for the light emitting element, thereby reducing the number of parts and making it easy to assemble a two-way optical communication device.

According to the present invention, incoming light reflected from a light emitting element and a submount can be prevented from being coupled back to an optical fiber, resulting in a reduction in other-end module reflection.

According to the present invention, incoming light reflected from a photodetecting surface of a photodetector can be prevented from being coupled back to an optical fiber, resulting a reduction in other-end module reflection.

According to the present invention, transmitted light and incoming light reflected by an optical fiber are separated by a reflection mirror which guides the incoming light to a photodetector, thereby making it possible to prevent interference due to near-end reflection and reduce the number of parts. Further, since such separation is achieved by the reflection mirror made of a thin film, a reception region can be large so that separation loss can be minimized. Furthermore, stray light can be prevented from entering the photodetector which causes interference.

According to the present invention, since transmitted light is condensed by a reflection mirror, an additional condensing lens is not required. Therefore, the number of parts is reduced, thereby making it easy to adjust assembly.

According to the present invention, a transmitter portion and a receiver portion are optically separated by a reflection mirror made of a thin film. Therefore, incoming light is passed in the vicinity of the receiver portion, thereby minimizing the boundary between a transmission region and a reception region and therefore reducing the size of a two-way optical communication device.

According to the present invention, a condensing optical system for transmission and reception can be constructed by a single optical member, resulting in a small-size, inexpensive, and easy-to-assemble two-way optical communication device.

According to the present invention, incoming light reflected from a light emitting element and a submount can be prevented from being coupled back to an optical fiber, resulting in a reduction in other-end module reflection.

According to the present invention, incoming light reflected from a photodetecting surface of a photodetector can be prevented from being coupled back to an optical fiber, resulting in a reduction in other-end module reflection.

According to the present invention, a portion of a reflection mirror can reliably prevent interference due to near-end reflection.

According to the present invention, a photodetector is electrically and electromagnetically separated from a light emitting element, thereby reducing electric and electromagnetic interference.

According to the present invention, a light emitting element and an optical member can be positioned with respect to each other with high precision using a simple method. Further, the number of parts can be reduced, thereby obtaining an inexpensive two-way optical communication device.

According to the present invention, a photodetector and an optical member can be positioned with respect to each other with high precision using a simple method. Further, the number of parts can be reduced, thereby obtaining an inexpensive two-way optical communication device.

According to the present invention, full duplex communication can be realized using a single optical fiber, thereby obtaining a small-size and low-cost two-way optical communication system.

According to the present invention, interference due to far-end reflection of an optical fiber can be suppressed. Further, transmitted light reflected by an optical fiber can be directed to a peripheral direction of the optical fiber, thereby easily preventing interference due to near-end reflection. Furthermore, incoming light is refracted toward a photodetector side, thereby making it possible to couple incoming light to the photodetector with high efficiency.

According to the present invention, interference due to far-end reflection of an optical fiber can be suppressed. Further, transmitted light reflected by an optical fiber can be directed -to a peripheral direction of the optical fiber, thereby easily preventing interference due to near-end reflection. Further, incoming light can be condensed, thereby making it possible to couple incoming light to the photodetector with high efficiency. Furthermore, it is not necessary to restrict a specific connection direction between an optical fiber and a two-way optical communication device, resulting in easy connection.

According to the present invention, an optical fiber is a POF, whereby a bend loss is small and the optical fiber is unlikely to be broken. Further, an optical fiber having a large core diameter of about 1 mm can be easily produced, thereby making it possible to easily join the optical fiber to a two-way optical communication device, and to produce an inexpensive two-way optical communication system.

According to the present invention, an optical fiber is a PCF, whereby a transmission band is broad and long-distance and high-speed communication can be realized.

According to the present invention, a light emitting element and an optical member can be positioned with respect to each other with high precision using a simple method to assemble a receiver portion.

According to the present invention, a photodetector and an optical member can be positioned with respect to each other with high precision using a simple method to assemble a transmitter portion.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A two-way optical communication device for use in a two-way optical communication system for transmitting and receiving an optical signal via a single optical fiber, comprising:
    a light emitting element for generating transmitted light;
    a photodetector for receiving incoming light emitted from the optical fiber; and
    a reflection mirror made of a thin film having a high reflectance, having first and second surfaces, the first surface being opposite to the second surface, wherein:
    an optical member including the reflection mirror is provided closer to the optical fiber than the light emitting element;
    the first surface is provided on the photodetector side and the second surface is provided on the light emitting element side;
    the incoming light emitted from the optical fiber is reflected by the first surface of the reflection mirror to be guided to the photodetector; and
    the transmitted light emitted from the light emitting element, or the transmitted light reflected by an end surface of the optical fiber, is reflected by at least a portion of the second surface of the reflection mirror to prevent the transmitted light from entering the photodetector.

2. A two-way optical communication device according to claim 1, wherein:
    the reflection mirror is in the shape of a curved surface;
    the incoming light emitted from the optical fiber is reflected and condensed by the reflection mirror; and
    the condensed incoming light is coupled to the photodetector.

3. A two-way optical communication device according to claim 1, wherein the transmitted light emitted from the light emitting element propagates through a portion of the optical member including the reflection mirror.

4. A two-way optical communication device according to claim 1, further comprising a lens for condensing the transmitted light emitted from the light emitting element, wherein the lens is provided in the optical member.

5. A two-way optical communication device according to claim 4, wherein a surface of the optical member is used as a portion of a shielding member for shielding the light emitting element from the outside, the lens being provided on the surface of the optical member.

6. A two-way optical communication device according to claim 1, further comprising a prism for refracting the transmitted light into the optical fiber, wherein the prism is provided in the optical member at a first position, the transmitted light being emitted from the first position to the optical fiber.

7. A two-way optical communication device according to claim 1, wherein an optical axis of the light emitting element is tilted with respect to an optical axis of the optical fiber.

8. A two-way optical communication device according to claim 1, wherein a photodetecting surface of the photodetector is tilted with respect to an optical axis of the optical fiber.

9. A two-way optical communication device according to claim 1, wherein a portion of the reflection mirror contacts or is close to an end surface of the optical fiber.

10. A two-way optical communication device according to claim 1, wherein the reflection mirror is electrically connected to a ground electrode of the photodetector.

11. A two-way optical communication device according to claim 1, wherein a photodetector positioning portion for setting a relative position of the photodetector with respect to the optical member is provided at a portion of the optical member, and the photodetector is positioned using the photodetector positioning portion.

12. A method for assembling a two-way optical communication device according to claim 11, wherein a receiver portion assembling member for setting relative positions of the portion of the optical member and the photodetector positioning portion by contacting the receiver portion assembling member with the portion of the optical member and the photodetector positioning portion is used to position the photodetector and the optical member.

13. A two-way optical communication device according to claim 1, wherein a light emitting element positioning portion for setting a relative position of the light emitting element with respect to the optical member is provided at a portion of the optical member, and the light emitting element is positioned using the light emitting element positioning portion.

14. A method for assembling a two-way optical communication device according to claim 13, wherein the light emitting element positioning portion of the optical member and a portion of the light emitting element are positioned with respect each other, or the light emitting element positioning portion of the optical member and a holding portion having the light emitting element attached thereto are positioned with respect each other so as to position the light emitting element and the optical member.

15. A two-way optical communication system, comprising a plurality of two-way optical communication devices joined to respective ends of optical fibers, wherein an optical signal is transmitted and received between at least two of the plurality of two-way optical communication device; and at least one of the plurality of two-way optical communication devices is a two-way optical communication device according to claim 1.

16. A two-way optical communication system according to claim 15, wherein the end surface of the optical fiber is tilted with respect to an optical axis of the optical fiber.

17. A two-way optical communication system according to claim 15, wherein the end surface of the optical fiber is in the shape of a spherical surface.

18. A two-way optical communication system according to claim 15, wherein the optical fiber is a plastic optical fiber including a core and a clad both made of plastic material.

19. A two-way optical communication system according to claim 15, wherein the optical fiber is a polymer clad fiber including a clad made of plastic material and a core made of quartz.

20. A two-way optical communication device according to claim 1, wherein a portion of the transmitted light emitted by the light emitting element and not coupled to the optical fiber is reflected by the second surface of the reflection mirror.

21. A two-way optical communication device according to claim 1, wherein a portion of the transmitted light emitted from the light emitting element and reflected by an end surface of the optical fiber is reflected by the second surface of the reflection mirror.

* * * * *